(12) United States Patent
Endo (10) Patent No.: US 12,505,703 B2
(45) Date of Patent: Dec. 23, 2025

(54) DRIVER WATCHING DEVICE, DRIVER WATCHING SYSTEM, AND DRIVER WATCHING METHOD

(71) Applicant: TOYOTA JIDOSHA KABUSHIKI KAISHA, Aichi-ken (JP)

(72) Inventor: Masato Endo, Nagoya (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 379 days.

(21) Appl. No.: 18/190,973

(22) Filed: Mar. 28, 2023

(65) Prior Publication Data

US 2023/0351811 A1    Nov. 2, 2023

(30) Foreign Application Priority Data

May 2, 2022   (JP) ................. 2022-076307

(51) Int. Cl.
| | | |
|---|---|---|
| G06F 21/84 | (2013.01) | |
| B60W 40/09 | (2012.01) | |
| G07C 5/00 | (2006.01) | |
| G07C 5/08 | (2006.01) | |
| H04W 4/40 | (2018.01) | |
| H04N 7/18 | (2006.01) | |

(52) U.S. Cl.
CPC .......... *G07C 5/008* (2013.01); *G07C 5/0808* (2013.01); *H04W 4/40* (2018.02)

(58) Field of Classification Search
CPC ........ G07C 5/008; G07C 5/0808; H04W 4/40
USPC ...................... 701/1, 36; 705/14.62; 180/167
See application file for complete search history.

(56) References Cited

U.S. PATENT DOCUMENTS

2020/0184500 A1    6/2020   Yuyama et al.

FOREIGN PATENT DOCUMENTS

| JP | H11-120488 | A |   | 4/1999 |
|---|---|---|---|---|
| JP | 2011-205372 | A |   | 10/2011 |
| JP | 2018169942 | A | * | 11/2018 |
| JP | 201912481 | A | * | 1/2019 |
| JP | 202095403 | A | * | 6/2020 |

\* cited by examiner

*Primary Examiner* — Helal A Algahaim
*Assistant Examiner* — Kendrick K Ly
(74) *Attorney, Agent, or Firm* — HAUPTMAN HAM, LLP (57) ABSTRACT

A driver watching device includes a vehicle information acquisition unit that acquires, based on information acquired from a vehicle driven by a person being watched over, vehicle information on the vehicle, a transmission unit that is able to transmit the vehicle information to a terminal device available to a person other than the person being watched over, and an information control unit that prohibits the transmission unit from transmitting specific information included in the vehicle information to the terminal device.

8 Claims, 8 Drawing Sheets

| CONTENT OF VEHICLE-RELATED INFORMATION | ATTRIBUTE |
|---|---|
| POSITION INFORMATION | SPECIFIC INFORMATION |
| DOZING DETECTION INFORMATION | GENERAL INFORMATION |
| VEHICLE SPEED INFORMATION | GENERAL INFORMATION |
| PCS ACTIVATION INFORMATION | GENERAL INFORMATION |
| ⋮ | ⋮ |

DRIVER WATCHING DEVICE, DRIVER WATCHING SYSTEM, AND DRIVER WATCHING METHOD

CROSS-REFERENCE TO RELATED APPLICATION

This application claims priority to Japanese Patent Application No. 2022-076307 filed on May 2, 2022, incorporated herein by reference in its entirety.

BACKGROUND

1. Technical Field

The present disclosure relates to a driver watching device, a driver watching system, and a driver watching method.

2. Description of Related Art

A system is conceivable in which, when a person being watched over drives a vehicle, a driving history and a driving diagnosis result of the person being watched over are transmitted to a terminal device available to a watcher. In this case, the person being watched over is, for example, an elderly person or a newly licensed driver, and the watcher is a family member of the person being watched over.

SUMMARY

When the above system is operated, the person being watched over may feel uncomfortable that the driving history and the driving diagnosis result of the person being watched over are transmitted to the terminal device regardless of his/her intention.

In consideration of the above facts, an object of the present disclosure is to provide a driver watching device, a driver watching system, a driver watching method, and a program capable of transmitting vehicle information related to a vehicle driven by a person being watched over to a terminal device used by a third party, while suppressing discomfort to the person being watched over.

A driver watching device according to at least one embodiment includes: a vehicle information acquisition unit that acquires, based on information acquired from a vehicle driven by a person being watched over, vehicle information on the vehicle; a transmission unit that is able to transmit the vehicle information to a terminal device available to a person other than the person being watched over; and an information control unit that prohibits the transmission unit from transmitting specific information included in the vehicle information to the terminal device.

In the driver watching device according to at least one embodiment, the vehicle information acquisition unit acquires, based on the information acquired from the vehicle driven by the person being watched over, the vehicle information on the vehicle. Further, the transmission unit is able to transmit the vehicle information to the terminal device available to the person other than the person being watched over. However, the information control unit prohibits the transmission unit from transmitting the specific information to the terminal device.

As described above, the specific information is not transmitted to the terminal device. Therefore, the driver watching device according to at least one embodiment can transmit the vehicle information on the vehicle driven by the person being watched over to the terminal device used by a third party while suppressing discomfort to the person being watched over.

In the driver watching device according to the disclosure indicated in at least one embodiment, the information control unit prohibits the transmission unit from transmitting the specific information to the terminal device when a privacy mode is set as a use mode of the vehicle, and permits the transmission unit to transmit the specific information to the terminal device when the privacy mode is canceled.

According to the disclosure indicated in at least one embodiment, it is possible to prohibit the specific information from being transmitted to the terminal device only when the privacy mode is set.

In the driver watching device according to the disclosure indicated in at least one embodiment, when the privacy mode is set and danger information indicating that the person being watched over is in a dangerous situation is received, the information control unit cancels the privacy mode.

According to the disclosure indicated in at least one embodiment, when the privacy mode is set and the danger information indicating that the person being watched over is in a dangerous situation is received, the information control unit cancels the privacy mode. Therefore, in this case, the person other than the person being watched over can recognize the vehicle information on the vehicle driven by the person being watched over by using the terminal device.

In the driver watching device according to the disclosure indicated in at least one embodiment, the vehicle information includes a driving diagnosis result of the person being watched over; and the information control unit permits the transmission unit to transmit at least a part of the driving diagnosis result to the terminal device when the privacy mode is set.

In the disclosure according to at least one embodiment, the information control unit permits the transmission unit to transmit at least a part of the driving diagnosis result to the terminal device when the privacy mode is set. Therefore, even when the privacy mode is set, the person other than the person being watched over can recognize at least a part of the driving diagnosis result by using the terminal device.

In the driver watching device according to the disclosure indicated in at least one embodiment, the information control unit prohibits the privacy mode from being set when the vehicle is traveling in a predetermined first area.

In the disclosure according to at least one embodiment, the privacy mode is prohibited from being set when the vehicle is traveling in the predetermined first area. Therefore, the person other than the person being watched over can recognize the specific information of the vehicle traveling in the first area by using the terminal device.

The driver watching device according to the disclosure indicated in at least one embodiment, a specific information determination unit for determining the specific information.

According to the disclosure indicated in at least one embodiment, the specific information determination unit can determine the specific information. Therefore, the content of the specific information can be set as appropriate.

A driver watching system according to the disclosure indicated in at least one embodiment includes a vehicle, an external server, and a terminal device. The external server includes: a vehicle information acquisition unit that acquires, based on information acquired from the vehicle driven by a person being watched over, vehicle information on the vehicle; a transmission unit that is able to transmit the vehicle information to the terminal device available to a person other than the person being watched over; and an information control unit that prohibits the transmission unit from transmitting specific information included in the vehicle information to the terminal device.

A driver watching method according to the disclosure indicated in at least one embodiment includes: a step pf acquiring, based on information acquired from a vehicle driven by a person being watched over, vehicle information on the vehicle; and a step of prohibiting specific information included in the vehicle information from being transmitted to a terminal device available to a person other than the person being watched over and permitting the vehicle information other than the specific information to be transmitted to the terminal device.

A program according to the disclosure indicated in at least one embodiment causes a computer to execute: a process pf acquiring, based on information acquired from a vehicle driven by a person being watched over, vehicle information on the vehicle; and a process of prohibiting specific information included in the vehicle information from being transmitted to a terminal device available to a person other than the person being watched over and permitting the vehicle information other than the specific information to be transmitted to the terminal device.

As described above, the driver watching device, the driver watching system, the driver watching method, and the program according to the present disclosure exert an advantageous effect that makes it possible to transmit the vehicle information on the vehicle driven by the person being watched over to the terminal device used by the third party while suppressing discomfort to the person being watched over.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, embodiments of a driver watching device, a driver watching system (hereinafter, referred to as a system), a driver watching method, and a program according to the present disclosure will be described with reference to the accompanying drawings.

Figure 1:
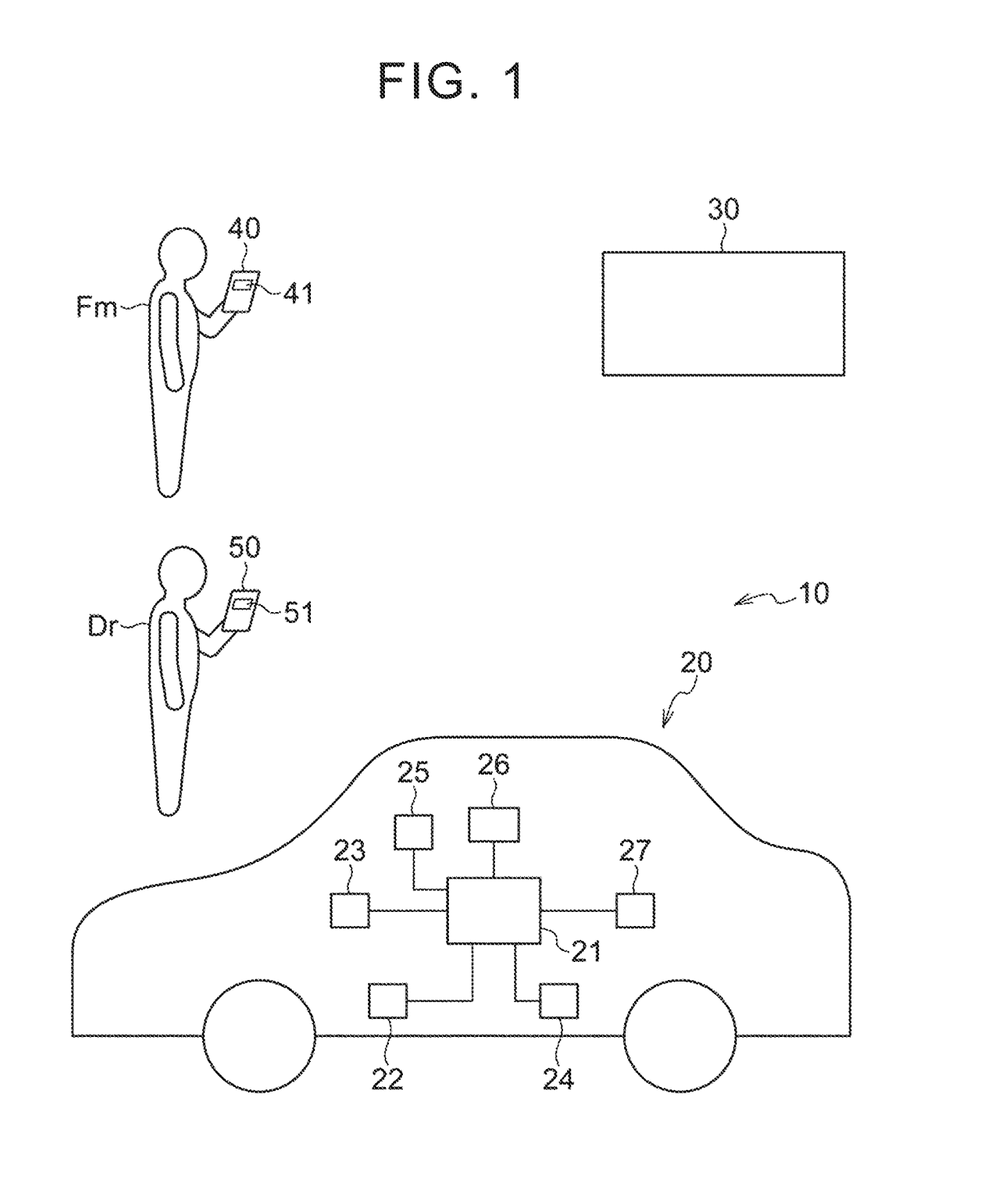
FIG. 1 is an overall view of a driver watching system according to an embodiment.

As shown in FIG. 1, a system 10 according to the present embodiment includes a vehicle 20, an external server (driver watching device) (computer) 30, a mobile terminal (terminal device) (computer) 40, and a mobile terminal 50.

The vehicle 20 capable of data communication with the external server 30 and the mobile terminals 40 and 50 via a network includes an electronic control unit (ECU) 21, a wheel speed sensor 22, an accelerator operation amount sensor 23, a brake depression force sensor 24, a steering angle sensor 25, a camera 26, and a global positioning system (GPS) receiver 27, as shown in FIG. 1. The wheel speed sensor 22, the accelerator operation amount sensor 23, the brake depression force sensor 24, the steering angle sensor 25, the camera 26, and the GPS receiver 27 are connected to the ECU 21.

The vehicle 20 is provided with the four wheel speed sensors 22. Each wheel speed sensor 22 detects a wheel speed of corresponding one of the four wheels. The accelerator operation amount sensor 23 detects an accelerator operation amount. The brake depression force sensor 24 detects the brake depression force input to a brake pedal (not shown) by a driver Dr who is a person being watched over. The steering angle sensor 25 detects the steering angle of a steering wheel (not shown). The GPS receiver 27 acquires information on a position where the vehicle 20 is traveling (hereinafter, referred to as "position information") by receiving a GPS signal transmitted from a GPS satellite. Detected values detected by the wheel speed sensor 22, the accelerator operation amount sensor 23, the brake depression force sensor 24, the steering angle sensor 25, and the GPS receiver 27 every time a predetermined time elapses are transmitted to the ECU 21 via a controller area network (CAN) provided in the vehicle 20, and are stored in a storage 21D of the ECU 21, which will be described below, in association with time information. Further, the camera 26 repeatedly captures an image of the face of the driver Dr sitting in a driver's seat (not shown) of the vehicle 20 every time a predetermined time elapses. The image data acquired by the camera 26 is transmitted to the ECU 21 via a network provided in the vehicle 20, and is stored in the storage 21D in association with the position information and the time information.

Figure 2:
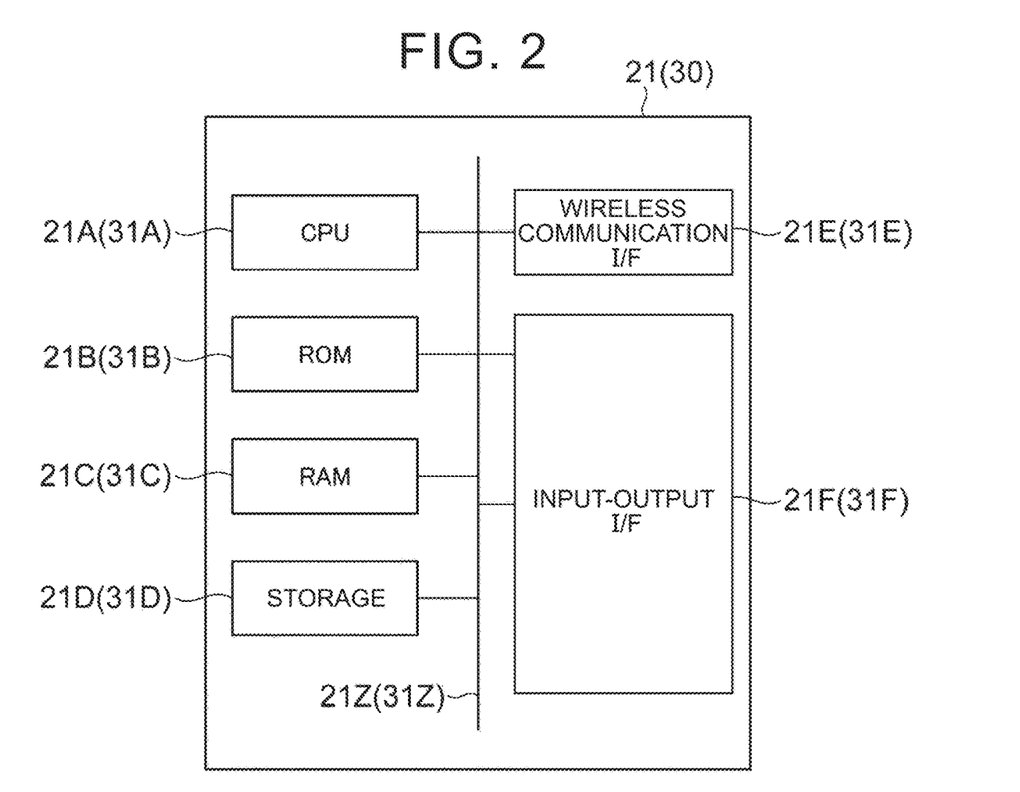
FIG. 2 is a control block diagram of an electronic control unit (ECU) of a vehicle and an external server shown in FIG. 1.

The ECU (computer) 21 shown in FIG. 2 is configured to include a central processing unit (CPU: processor) 21A, a read-only memory (ROM) 21B, a random access memory (RAM) 21C, a storage 21D, a wireless communication interface (I/F) 21E, and an input-output I/F 21F. The CPU 21A, the ROM 21B, the RAM 21C, the storage 21D, the wireless communication I/F 21E, and the input-output I/F 21F are connected so as to be able to communicate with each other via a bus 21Z. The CPU 21A can acquire information related to the date and time from a timer (not shown).

The CPU 21A is a central processing unit that executes various programs and controls various units. That is, the CPU 21A reads a program from the ROM 21B or the storage 21D and executes the program using the RAM 21C as a work area. The CPU 21A controls each configuration and executes various arithmetic processes (information processes) in accordance with the program recorded in the ROM 21B or the storage 21D.

The ROM 21B stores various programs and various data. The RAM 21C temporarily stores programs or data as a work area. The storage 21D is composed of a storage device such as a hard disk drive (HDD) or a solid state drive (SSD), and stores various programs and various data.

The wireless communication I/F 21E is an interface for wireless communication with various devices. For example, the wireless communication I/F 21E can wirelessly communicate with the external server 30 and the mobile terminal 40 via a network (for example, the Internet).

Figure 3:
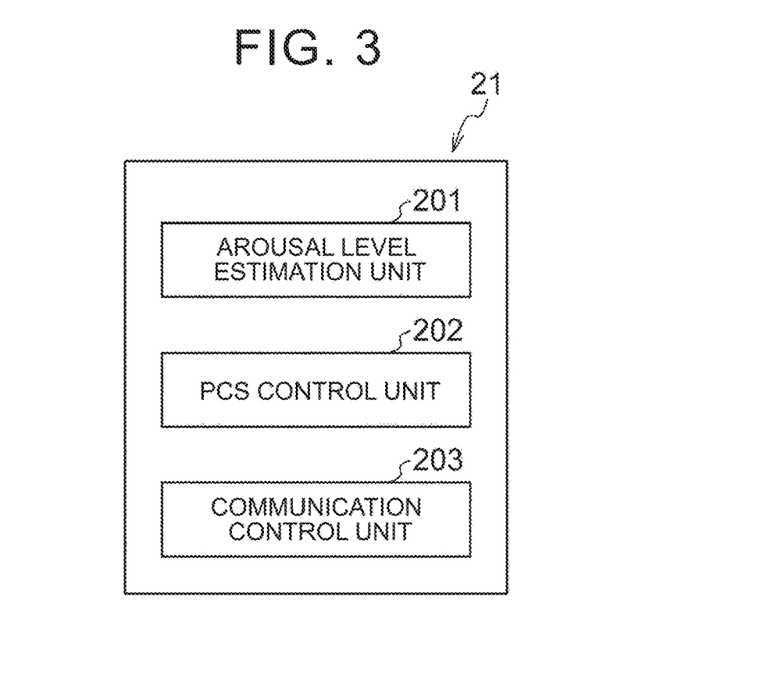
FIG. 3 is a functional block diagram of the ECU.

FIG. 3 is a block diagram showing an example of a functional configuration of the ECU 21. The ECU 21 includes an arousal level estimation unit 201, a precrash safety system (PCS) control unit 202, and a communication control unit 203 as functional configurations. These functions are realized as the CPU 21A reads and executes the program stored in the ROM 21B.

The arousal level estimation unit 201 determines the arousal level of the driver Dr based on the state of the eyes of the driver Dr and the like included in the image data captured by the camera 26. The term "arousal level" in the present specification includes an arousal level when a person is awake and a sleep level (sleep depth) when a person is in a sleeping state. The sleep level (sleep depth) is defined in five stages. The number of the sleep level (sleep depth) increases as the sleep level of the driver Dr is high. The sleep level 1 is a level corresponding to rapid eye movement (REM) sleep. The sleep levels 2 to 5 are levels corresponding to non-rapid eye movement (Non-REM) sleep. When the sleep level is equal to or higher than a predetermined level, the arousal level estimation unit 201 determines that the driver Dr is dozing off while driving, and records dozing detection information indicating the determination result in the storage 21D in association with the position information and the time information. An example of the predetermined level is the sleep level 1.

The PCS control unit 202 has a function of controlling a precrash safety system (PCS) mounted on the vehicle 20. That is, when a predetermined condition is satisfied, a braking force is generated in a brake device (not shown) of the vehicle 20 by controlling a brake actuator of the brake device. When the PCS is activated, the PCS control unit 202 records PCS activation information indicating the activation of the PCS in the storage 21D in association with the position information and the time information.

The communication control unit 203 controls the wireless communication I/F 21E. The wireless communication I/F 21E controlled by the communication control unit 203 wirelessly transmits information on each detected value recorded in the storage 21D, the image data, the dozing detection information, and the PCS activation information to the external server 30 at predetermined time intervals. Hereinafter, the information on each detected value, the image data, the dozing detection information, and the PCS activation information may be collectively referred to as vehicle-related information (vehicle information).

As shown in FIG. 2, the external server 30 is configured to include a CPU 31A, a ROM 31B, a RAM 31C, a storage 31D, a wireless communication I/F (vehicle information acquisition unit) (transmission unit) 31E, and an input-output I/F 31F. The CPU 31A, the ROM 31B, the RAM 31C, the storage 31D, the wireless communication I/F 31E, and the input-output I/F 31F are connected so as to be able to communicate with each other via a bus 31Z. The CPU 31A, the ROM 31B, the RAM 31C, the storage 31D, the wireless communication I/F 31E, and the input-output I/F 31F have functions corresponding to the CPU 21A, the ROM 21B, the RAM 21C, the storage 21D, the wireless communication I/F 21E, and the input-output I/F 21F, respectively. The map data is recorded in the storage 31D. This map data includes information indicating at least one dangerous area (first area). Areas other than the dangerous areas are safe areas.

Figure 4:
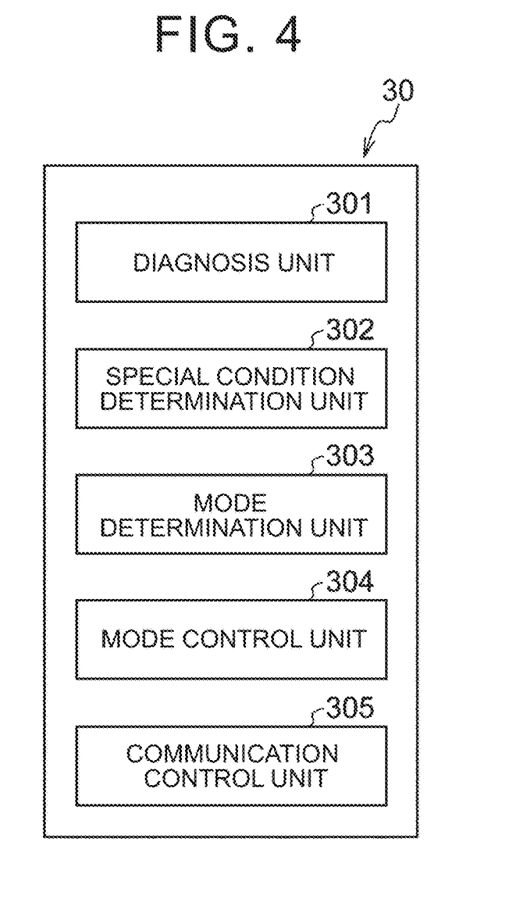
FIG. 4 is a functional block diagram of the external server.

FIG. 4 is a block diagram showing an example of a functional configuration of the external server 30. The external server 30 includes a diagnosis unit 301, a special condition determination unit 302, a mode determination unit 303, a mode control unit 304, and a communication control unit (information control unit) 305 as functional configurations. These functions are realized as the CPU 31A reads and executes the program stored in the ROM 31B.

The diagnosis unit 301 executes driving diagnosis based on the vehicle-related information received by the wireless communication I/F 31E from vehicle 20. For example, as disclosed in Japanese Unexamined Patent Application Publication No. 2019-12481 (JP 2019-12481 A) and Japanese Unexamined Patent Application Publication No. 2020-95403 (JP 2020-95403 A), a driving diagnosis method performed based on the above-mentioned vehicle-related information is well known. The driving diagnosis method in the present disclosure may be any method. For example, the diagnosis unit 301 executes driving diagnosis of an accelerator operation based on the detected value of the accelerator operation amount sensor 23 and the detected value of the wheel speed sensor 22, executes driving diagnosis of a brake operation based on the detected value of the brake depression force sensor 24 and the detected value of the wheel speed sensor 22, and executes driving diagnosis of a steering operation based on the detected value of the steering angle sensor 25. Further, the diagnosis unit 301 determines whether the vehicle speed of the vehicle 20 exceeds the speed limit based on information on the speed limit of each road included in the map data recorded in the storage 31D, the position information of the vehicle 20, and the detected value of the wheel speed sensor 22. Further, the diagnosis unit 301 calculates the points of the accelerator operation, the brake operation, and the steering operation based on these driving diagnosis results. Further, the diagnosis unit 301 records these diagnostic results (vehicle information) in the storage 31D. At this time, the diagnosis unit 301 records each diagnosis result in the storage 31D in association with the position information of the vehicle 20 and the time information.

The special condition determination unit 302 determines whether a predetermined special condition is satisfied. The special condition is satisfied when at least one of the following conditions 1 to 3 is satisfied.

Condition 1: A family member Fm of the driver Dr (a person other than the driver Dr) uses the mobile terminal 40 to transmit an emergency notification request to the external server 30.

Condition 2: At least one of the dozing detection information and the PCS activation information is included in the vehicle-related information received by the external server 30 from the vehicle 20.

Condition 3: It is determined that the vehicle 20 is traveling in a dangerous area preset in the map data based on the position information transmitted from the vehicle 20.

The mode determination unit (specific information determination unit) 303 sets a use mode of the vehicle 20 and determines whether the use mode is a privacy mode. In the present embodiment, based on information input using an input device (not shown) provided in the external server 30, the mode determination unit 303 determines the use mode and contents of a first list 33 and a second list 35 to be described below. The use mode of the vehicle 20 according to the present embodiment is set to the privacy mode. The storage 31D records data indicating that the use mode of the vehicle 20 is the privacy mode.

The mode control unit 304 prohibits the privacy mode in the use mode of the vehicle 20 when the special condition is satisfied. That is, the mode control unit 304 cancels the privacy mode of the vehicle 20 while the special condition is satisfied for the vehicle 20. Further, when the special condition is no longer satisfied for the vehicle 20, the mode control unit 304 resets the use mode of the vehicle 20 to the privacy mode.

Figure 5:
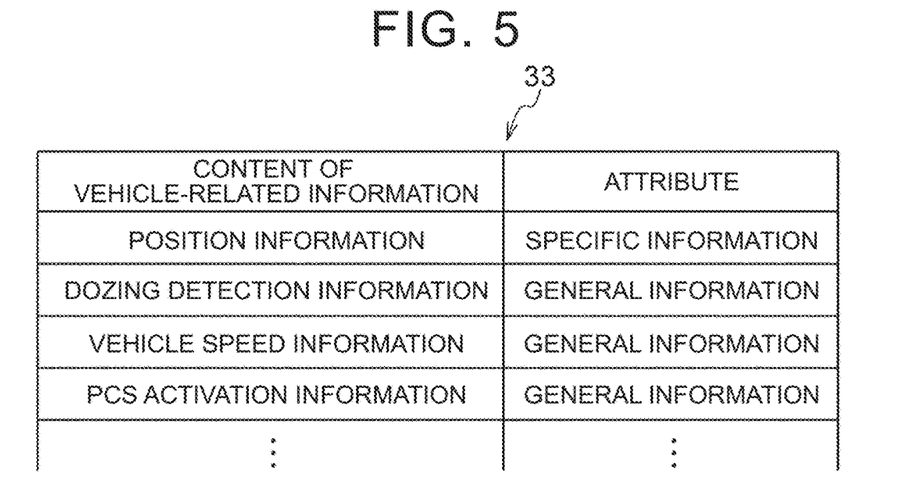
FIG. 5 is a diagram showing a first list.
Figure 6:
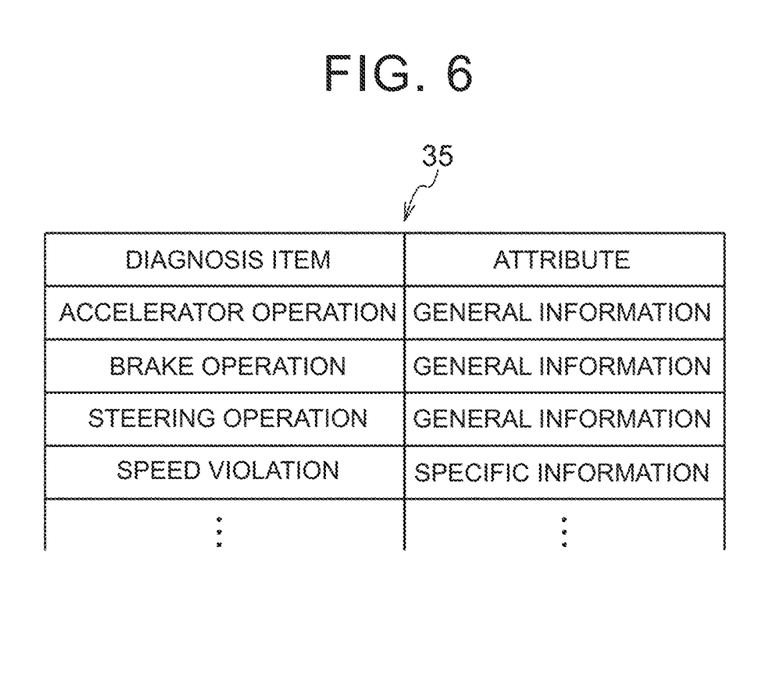
FIG. 6 is a diagram showing a second list.

The first list 33 shown in FIG. 5 and the second list 35 shown in FIG. 6 are recorded in the storage 31D. In the first list 33, the relationship between the content of the vehicle-related information of the vehicle 20 and the attribute of each vehicle-related information is defined. As shown in FIG. 5, the position information is specific information, and the dozing detection information, the PCS activation information, and vehicle speed information are general information. In the second list 35, the relationship between the item of each driving diagnosis generated by the diagnosis unit 301 and the attribute of each item is defined. As shown in FIG. 6, an item related to a speed violation is specific information, and items related to the accelerator operation, the brake operation, and the steering operation are general information.

The communication control unit 305 controls the wireless communication I/F 31E. Data received by the wireless communication I/F 31E from the vehicle 20 is recorded in the storage 31D. Further, the wireless communication I/F 31E controlled by the communication control unit 305 transmits various data recorded in the storage 31D to the mobile terminal 40 based on the first list 33 and the second list 35. When the use mode of the vehicle 20 is set to the privacy mode, the wireless communication I/F 31E does not transmit the specific information defined in the first list 33 and the second list 35 to the mobile terminal 40 in principle. On the other hand, the wireless communication I/F 31E transmits the general information defined in the first list 33 and the second list 35 to the mobile terminal 40 regardless of whether the use mode of the vehicle 20 is set to the privacy mode. Thus, the type of data transmitted from the wireless communication I/F 31E to the mobile terminal 40 changes depending on whether the use mode is set to the privacy mode.

The mobile terminal 40 shown in FIG. 1 is configured to include a CPU, a ROM, a RAM, a storage, a wireless communication I/F, and an input-output I/F. The mobile terminal 40 is, for example, a smart phone or a tablet computer. The CPU, the ROM, the RAM, the storage, the wireless communication I/F, and the input-output I/F of the mobile terminal 40 are connected to each other so as to be able to communicate with each other via a bus. The mobile terminal 40 can acquire information related to the date and time from a timer (not shown). The mobile terminal 40 is provided with a display unit 41 including a touch panel. As shown in FIG. 1, the mobile terminal 40 is possessed by one family member Fm of the driver Dr. A predetermined driving information display application is installed on the mobile terminal 40. Further, the map data is recorded in the storage of the mobile terminal 40.

Figure 7:
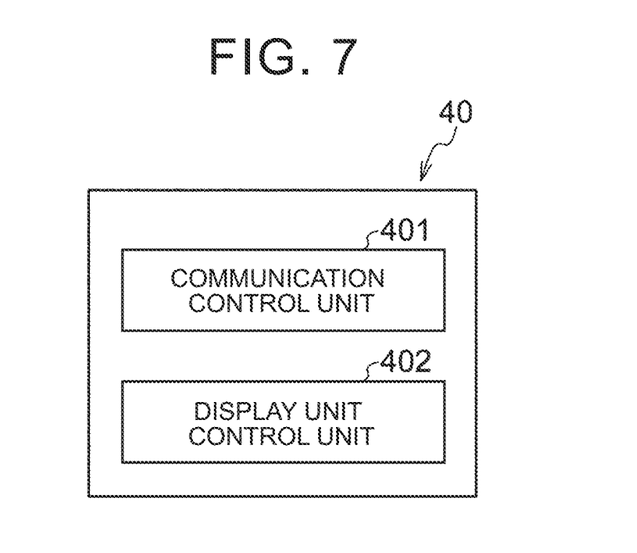
FIG. 7 is a functional block diagram of a mobile terminal shown in FIG. 1.

FIG. 7 is a block diagram showing an example of a functional configuration of the mobile terminal 40. The mobile terminal 40 includes a communication control unit 401 and a display unit control unit 402 as the functional configuration. The communication control unit 401 and the display unit control unit 402 are realized as the CPU reads and executes the program stored in the ROM.

The communication control unit 401 controls the wireless communication I/F.

The display unit control unit 402 controls the display unit 41. That is, the display unit control unit 402 causes the display unit 41 to display, for example, information received by the mobile terminal 40 from the vehicle 20 or the external server 30 and information input via the touch panel. The information input via the touch panel of the display unit 41 can be transmitted to the vehicle 20, the external server 30, and the mobile terminal 50 by the wireless communication I/F.

Further, the driver Dr possesses the mobile terminal (specific information determination unit) 50 shown in FIG. 1. The mobile terminal 50 has the same specifications as the mobile terminal 40 and includes a display unit 51 corresponding to the display unit 41. The above-mentioned driving information display application is installed on the mobile terminal 50.

Operation and Effects

Next, the operation and effects of the present embodiment will be described.

Figure 8:
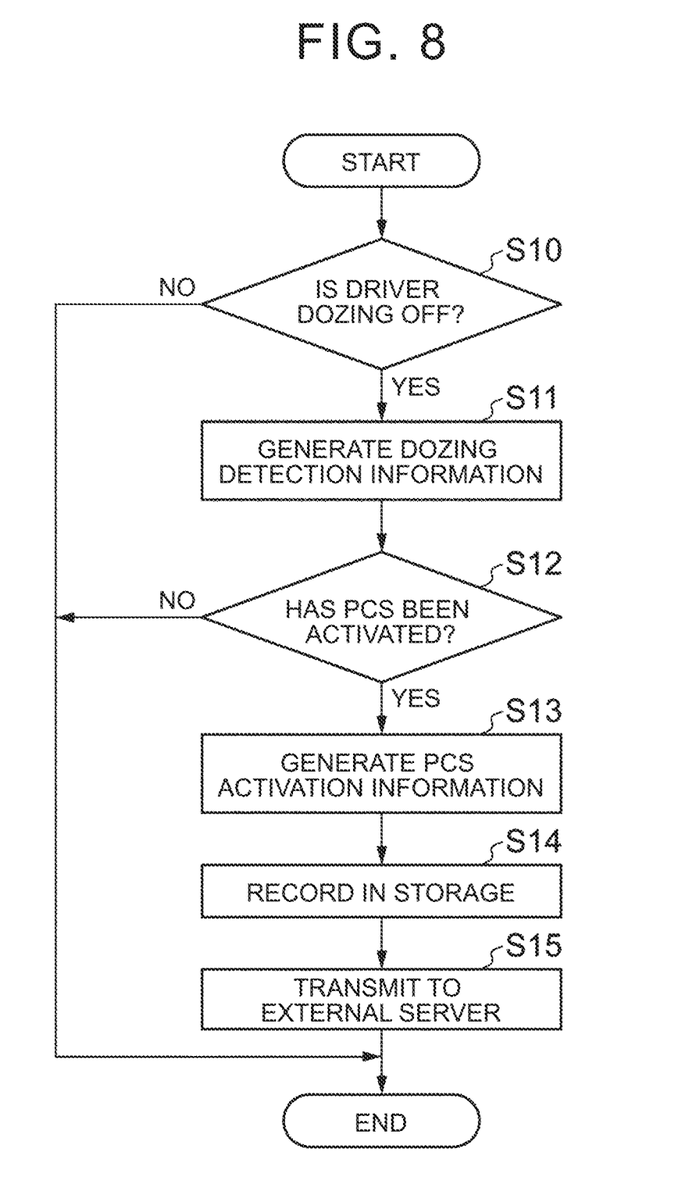
FIG. 8 is a flowchart showing a process executed by the ECU of the vehicle.

First, the flow of a process executed by the CPU 21A of the vehicle 20 will be described with reference to a flowchart of FIG. 8. The CPU 21A repeatedly executes the process of the flowchart shown in FIG. 8 every time a predetermined time elapses. In the following description, the process of the flowchart shown in each of FIGS. 8 to 11 is executed by one processor (CPU), but the process of the flowchart shown in each of FIGS. 8 to 11 may be executed by a plurality of devices (CPUs).

First, in step S10, the CPU 21A determines whether the sleep level of the driver Dr is equal to or higher than the predetermined level. When the determination result is Yes, the CPU 21A proceeds to step S11 and generates the dozing detection information. The dozing detection information is danger information.

Subsequently, the CPU 21A proceeds to step S12 and determines whether the PCS has been activated. When the determination result is Yes, the CPU 21A proceeds to step S13 and generates the PCS activation information. The PCS activation information is danger information.

Subsequently, the CPU 21A proceeds to step S14 and records the vehicle-related information in the storage 21D.

Subsequently, the CPU 21A proceeds to step S15 and controls the wireless communication I/F 21E such that the wireless communication I/F 21E transmits the vehicle-related information recorded in the storage 21D in step S14 to the external server 30.

When the determination result is NO in steps S10 and S12 or when the process of step S15 is ended, the CPU 21A temporarily ends the process of the flowchart shown in FIG. 8.

Next, the flow of the process executed by the CPU 31A of the external server 30 will be described with reference to the flowchart shown in FIG. 9. The CPU 31A repeatedly executes the process of the flowchart shown in FIG. 9 every time a predetermined time elapses.

First, in step S20, the CPU 31A determines whether the special condition has been satisfied. When the determination result is Yes, the CPU 31A proceeds to step S21 and prohibits the privacy mode in the use mode.

When the process of step S21 is ended or when the determination result is No in step S20, the CPU 31A proceeds to step S22 and determines whether the vehicle-related information has been received from the vehicle 20.

When the determination result is Yes in step S22, the CPU 31A proceeds to step S23 and records the vehicle-related information in the storage 31D.

When the process of step S23 is ended or when the determination result is No in step S22, the CPU 31A proceeds to step S24 and determines whether the use mode is the privacy mode.

When the determination result is YES in step S24, the CPU 31A proceeds to step S25, refers to the first list 33, and controls the wireless communication I/F 31E such that only the general information included in the vehicle-related information recorded in the storage 31D is transmitted to the mobile terminal 40.

When the determination result is No in step S24, the CPU 31A proceeds to step S26 and controls the wireless communication I/F 31E such that all pieces of the vehicle-related information recorded in the storage 31D are transmitted to the mobile terminal 40.

Figure 9:
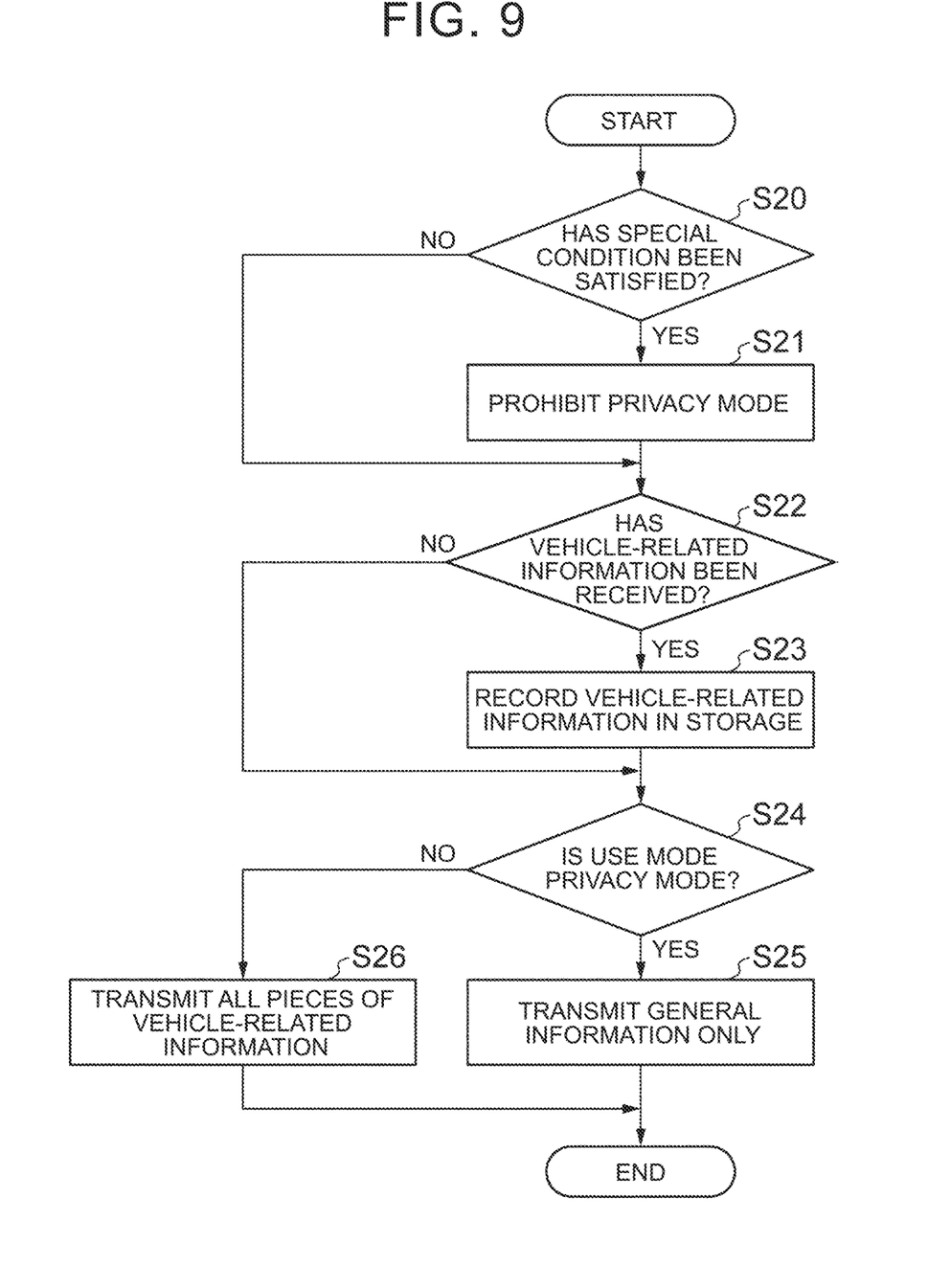
FIG. 9 is a flowchart showing a process executed by the external server.

When the process of step S25 or the process of S26 is ended, the CPU 31A temporarily ends the process of the flowchart shown in FIG. 9.

Next, the flow of the process executed by the CPU 31A of the external server 30 will be described with reference to the flowchart shown in FIG. 10. The CPU 31A repeatedly executes the process of the flowchart shown in FIG. 10 every time a predetermined time elapses.

The processes of steps S30, S31, and S32 are the same as the processes of steps S20, S21, and S22 described above, respectively.

When the determination result is Yes in step S32, the CPU 31A proceeds to step S33 and executes driving diagnosis.

Subsequently, the CPU 31A proceeds to step S34 and determines whether the driving diagnosis process has been completed.

When the determination result is Yes in step S34, the CPU 31A proceeds to step S35 and records the driving diagnosis result in the storage 31D.

When the process of step S35 is ended or when the determination result is No in step S32, the CPU 31A proceeds to step S36 and determines whether the use mode is the privacy mode.

When the determination result is YES in step S36, the CPU 31A proceeds to step S37, refers to the second list 35, and controls the wireless communication I/F 31E such that only the general information included in the driving diagnosis item recorded in the storage 31D is transmitted to the mobile terminal 40.

When the determination result is No in step S36, the CPU 31A proceeds to step S38 and controls the wireless communication I/F 31E such that all the driving diagnosis items recorded in the storage 31D are transmitted to the mobile terminal 40.

Figure 10:
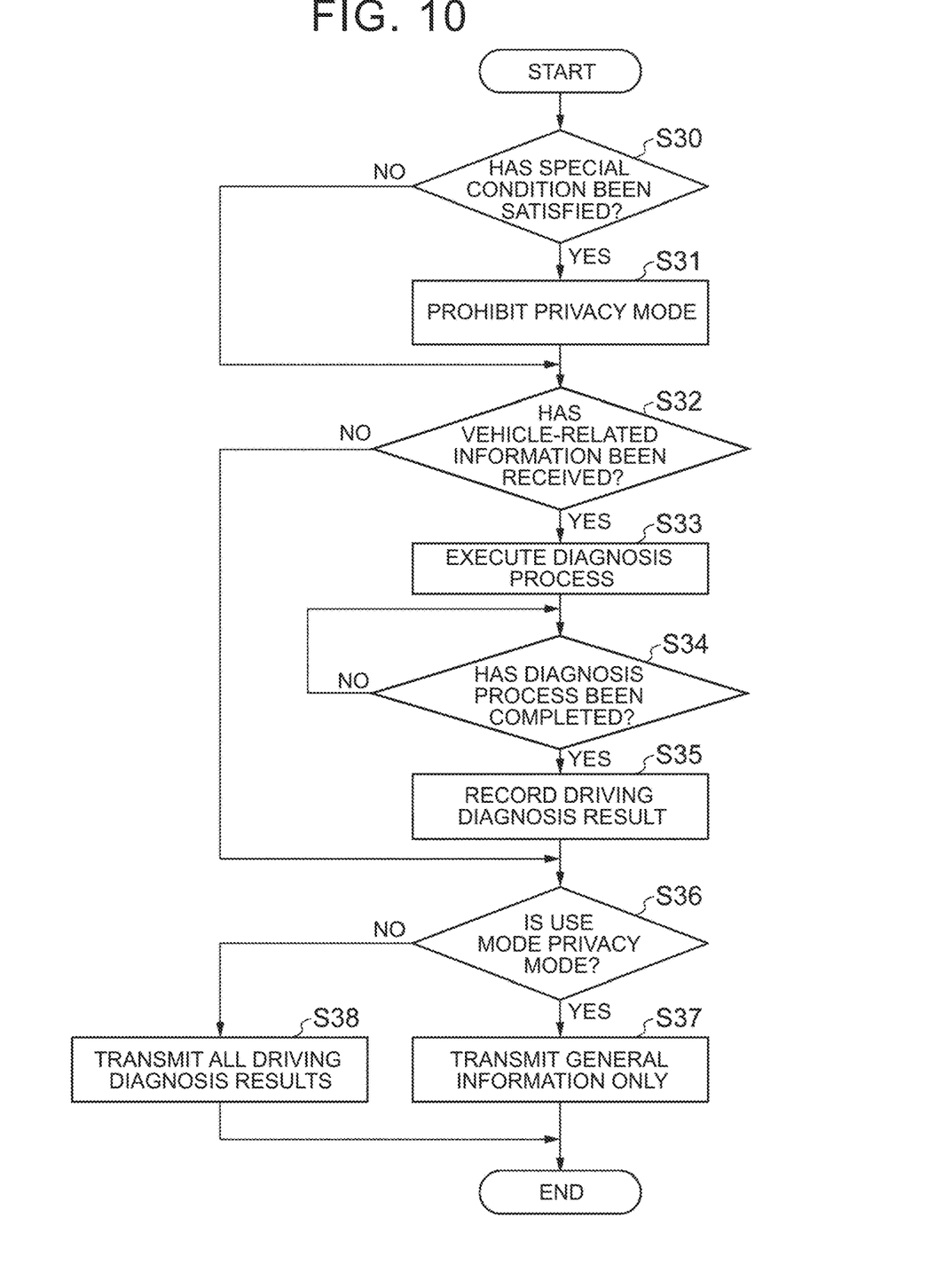
FIG. 10 is a flowchart showing a process executed by the external server.

When the process of step S37 or the process of S38 is ended, the CPU 31A temporarily ends the process of the flowchart shown in FIG. 10.

Next, the flow of the process executed by the CPU of the mobile terminal 40 will be described with reference to the flowchart shown in FIG. 11. The CPU repeatedly executes the process of the flowchart shown in FIG. 11 every time a predetermined time elapses.

First, in step S40, the CPU determines whether the driving information display application is activated.

When the determination result is Yes in step S40, the CPU proceeds to step S41 and determines whether the vehicle-related information or the driving diagnosis result has been received from the external server 30.

When the determination result is Yes in step S41, the CPU proceeds to step S42. When the mobile terminal 40 receives the vehicle-related information in step S41, the CPU causes the display unit 41 to display the vehicle-related information in step S42.

For example, when the use mode is set to the privacy mode, only the general information in the vehicle-related information of the vehicle 20 is displayed on the display unit 41 of the mobile terminal 40. Therefore, the position information of the vehicle 20 is not displayed on the display unit 41 in this case.

Further, for example, when the external server 30 receives the dozing detection information from the vehicle 20, the CPU 31A executes the processes of steps S21 and S26 shown in FIG. 9. In this case, the information indicating that the driver Dr is dozing off and the position information of the vehicle 20 are displayed on the display unit 41 in step S42. Therefore, the family member Fm can recognize that the driver Dr is dozing off and the current position of the vehicle 20 by looking at the display unit 41 of the mobile terminal 40. As a result, the family member Fm can contact the mobile terminal 50 possessed by the driver Dr by using the mobile terminal 40, for example.

Further, for example, when the use mode is not set to the privacy mode, all pieces of the vehicle-related information of the vehicle 20 are displayed on the display unit 41 of the mobile terminal 40. Therefore, in this case, the display unit 41 displays the position information of the vehicle 20 and the map data including the position information. As a result, the family member Fm can recognize the travel route and the current position of the vehicle 20 by looking at the display unit 41.

Further, when the mobile terminal 40 receives the driving diagnosis result in step S41, the CPU causes the display unit 41 to display the driving diagnosis result in step S42.

For example, when the use mode is set to the privacy mode, the display unit 41 displays only the general information in the driving diagnosis result. Therefore, even when the vehicle speed of the vehicle 20 exceeds the speed limit, the information indicating that the vehicle speed of the vehicle 20 exceeds the speed limit is not displayed on the display unit 41.

Further, for example, when the external server 30 receives the dozing detection information from the vehicle 20, the CPU 31A executes the processes of steps S31 and S38 shown in FIG. 10. Here, it is assumed that the vehicle speed of the vehicle 20 exceeds the speed limit. In this case, the information indicating that the driver Dr is dozing off and the information indicating that the vehicle speed of the vehicle 20 exceeds the speed limit are displayed on the display unit 41 in step S42. Therefore, the family member Fm can recognize that the driver Dr is dozing off and the vehicle speed of the vehicle 20 exceeds the speed limit by looking at the display unit 41.

Further, for example, when the use mode is not set to the privacy mode, the display unit 41 displays all the driving diagnosis results of the vehicle 20. Therefore, the family member Fm can recognize all the driving diagnosis results by looking at the display unit 41.

Figure 11:
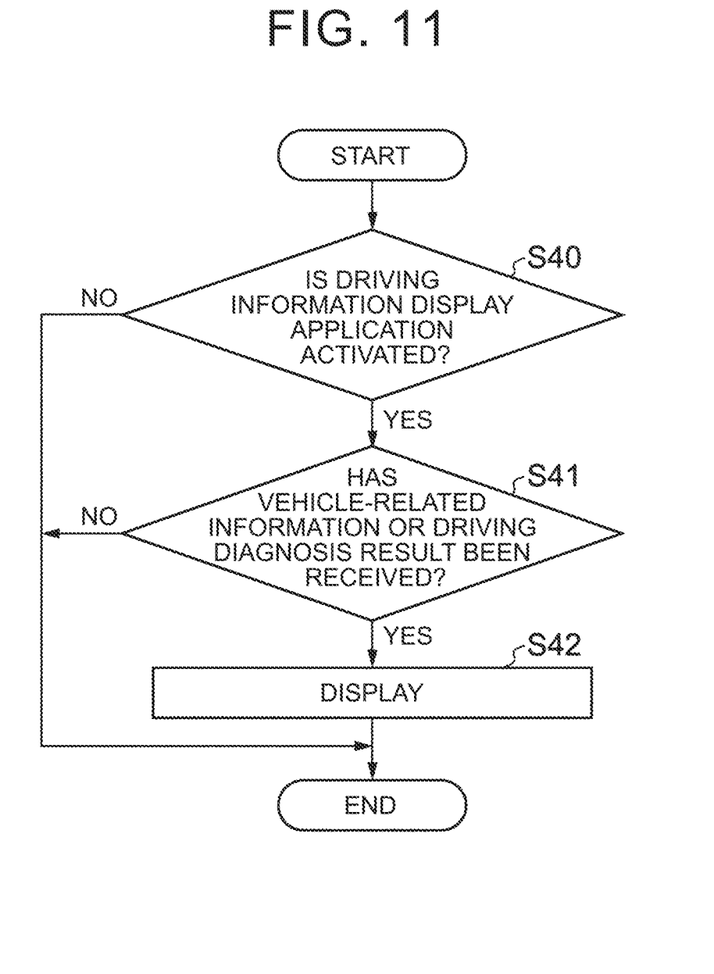
FIG. 11 is a flowchart showing a process executed by the mobile terminal.

When the process of step S42 is ended, or the determination result is NO in step S40 or step S41, the CPU 31A temporarily ends the process of the flowchart shown in FIG. 11.

As described above, in the present embodiment, the general information is transmitted from the external server 30 to the mobile terminal 40. On the other hand, when the privacy mode is set, the specific information is not transmitted from the external server 30 to the mobile terminal 40. Therefore, by setting the information that the driver Dr does not want the family member Fm to know as the specific information, the system 10 can transmit the vehicle information (vehicle-related information, driving diagnosis result) related to the vehicle 20 to the mobile terminal 40 while suppressing discomfort to the driver Dr.

Further, when the privacy mode is set and the external server 30 receives the danger information indicating that the driver Dr is in a dangerous situation, the privacy mode is canceled. Therefore, in this case, the family member Fm can recognize the vehicle information of the vehicle 20 by using the mobile terminal 40.

Further, setting of the privacy mode is prohibited when the vehicle 20 is traveling in a predetermined dangerous area (first area). Therefore, the family member Fm can recognize the vehicle information of the vehicle 20 traveling in the dangerous area by using the mobile terminal 40.

Further, when the privacy mode is set, the restrictions can be applied to the information received from the external server 30 only by the mobile terminal 40, and the restrictions cannot be applied to such information by the mobile terminal 50. Therefore, for example, the driver Dr can recognize all the diagnosis items of the driving diagnosis result and all pieces of the vehicle-related information received from the external server 30 by looking at the display unit 51 of the mobile terminal 50 in which the driving information display application is activated after getting off the vehicle 20.

Although the driver watching device, the driver watching system, the driver watching method, and the program according to the embodiment have been described above, the design of the driver watching device, the driver watching system, the driver watching method, and the program can be appropriately changed without departing from the scope of the present disclosure.

For example, at least one of the mobile terminal (specific information determination unit) 40 and the mobile terminal (specific information determination unit) 50 may have a function of setting the use mode. Further, the contents of the first list 33 and the second list 35 may be changed by the driver Dr operating the display unit 51 (touch panel) of the mobile terminal 50. For example, the vehicle speed information in the first list 33 may be set as the specific information, and the driving diagnosis item related to the brake operation in the second list 35 may be set as the specific information.

Further, the specific information may include a plurality of pieces of specific information with different degrees of freedom for viewing by the family member Fm. For example, it is assumed that the specific information includes first specific information and second specific information. The degree of freedom for viewing the first specific information is lower than the degree of freedom for viewing the second specific information. In this case, for example, when the above special condition is satisfied, the external server 30 may transmit the second specific information to the mobile terminal 40, and even when the special condition is satisfied, the external server 30 may not transmit the first specific information to the mobile terminal 40.

For example, the system 10 may be configured such that the use mode cannot be set, and the information transmitted to the mobile terminal 40 may be restricted according to a predetermined rule by the external server 30. That is, in this modification, the use mode of the vehicle 20 is not set to the privacy mode. For example, the external server 30 may transmit only the general information to the mobile terminal 40 without transmitting the specific information defined in the first list 33 and the second list 35 to the mobile terminal 40. In this case as well, the external server 30 may transmit the specific information to the mobile terminal 40 when the special condition is satisfied. Further, in this case, the system 10 may be configured such that the display unit 41 of the mobile terminal 40 displays the information on the dangerous area included in the map data.

The terminal device used by the family member Fm may be a personal computer and a display connected to the personal computer.

Appendix

The driver watching device according to the present disclosure may be any combination of configurations 1 to 6 below.

<Configuration 1> A driver watching device includes a vehicle information acquisition unit that acquires, based on information acquired from a vehicle driven by a person being watched over, vehicle information on the vehicle, a transmission unit that is able to transmit the vehicle information to a terminal device available to a person other than the person being watched over, and an information control unit that prohibits the transmission unit from transmitting specific information included in the vehicle information to the terminal device.

<Configuration 2> The information control unit prohibits the transmission unit from transmitting the specific information to the terminal device when a privacy mode is set as a use mode of the vehicle, and permits the transmission unit to transmit the specific information to the terminal device when the privacy mode is canceled.

<Configuration 3> When the privacy mode is set and danger information indicating that the person being watched over is in a dangerous situation is received, the information control unit cancels the privacy mode.

<Configuration 4> The vehicle information includes a driving diagnosis result of the person being watched over, and the information control unit permits the transmission unit to transmit at least a part of the driving diagnosis result to the terminal device when the privacy mode is set.

<Configuration 5> The information control unit prohibits the privacy mode from being set when the vehicle is traveling in a predetermined first area.

<Configuration 6> The driver watching device further includes a specific information determination unit for determining the specific information.

Further, the driver watching system according to the present disclosure may be a combination of configuration 7 below and at least one of configurations 1 to 6.

<Configuration 7> A driver watching system includes a vehicle, an external server, and a terminal device, and the external server includes a vehicle information acquisition unit that acquires, based on information acquired from the vehicle driven by a person being watched over, vehicle information on the vehicle, a transmission unit that is able to transmit the vehicle information to the terminal device available to a person other than the person being watched over, and an information control unit that prohibits the transmission unit from transmitting specific information included in the vehicle information to the terminal device.

Further, the driver watching method according to the present disclosure may be a combination of configuration 8 below and at least one of configurations 1 to 6.

<Configuration 8> A driver watching method includes a step of acquiring, based on information acquired from a vehicle driven by a person being watched over, vehicle information on the vehicle, and a step of prohibiting specific information included in the vehicle information from being transmitted to a terminal device available to a person other than the person being watched over and permitting the vehicle information other than the specific information to be transmitted to the terminal device.

Further, the program according to the present disclosure may be a combination of configuration 9 below and at least one of configurations 1 to 6.

<Configuration 9> A program causes a computer to execute a process of acquiring, based on information acquired from a vehicle driven by a person being watched over, vehicle information on the vehicle, and a process of prohibiting specific information included in the vehicle information from being transmitted to a terminal device available to a person other than the person being watched over and permitting the vehicle information other than the specific information to be transmitted to the terminal device.

What is claimed is:

1. A driver watching system comprising:
   a vehicle including a first processor;
   an external server including a second processor, wherein the external server is outside of the vehicle, and the external server is configured to receive vehicle information from the vehicle via a network;
   a terminal device configured to receive a specific information included in the vehicle information from the external server via the network, wherein
   the first processor is configured to determine whether a driver of the vehicle is dozing and whether a precrash safety system is activated, and send the vehicle information that includes a result of the determination to the external server,
   in response to a determination that the driver is not dozing and the precrash safety system is not activated, the second processor is configured to turn a privacy mode of the vehicle on,
   in response to a determination that the driver is dozing and the precrash safety system is activated, the second processor is configured to turn the privacy mode of the vehicle off,
   in response to the privacy mode being on, the second processor is configured to prohibit transmitting the specific information to the terminal device, and
   in response to the privacy mode being off, the second processor is configured to permit transmitting the specific information to the terminal device.

2. The driver watching device according to claim 1, wherein:
   the vehicle information includes a driving diagnosis result of the driver; and
   the second processor is configured to permit the transmission unit to transmit at least a part of the driving diagnosis result to the terminal device when the privacy mode is off.

3. The driver watching device according to claim 1, wherein the second processor is configured to prohibit the privacy mode from being on when the vehicle is traveling in a predetermined first area.

4. The driver watching device according to claim 1, the second processor is configured to determine the specific information.

5. A driver watching method comprising:
   determining whether a driver of a vehicle is dozing and whether a precrash safety system is activated, and sending the vehicle information that includes a result of the determination to an external server outside the vehicle, wherein the external server is usable to transmit specific information to a terminal device,
   in response to a determination that the driver is not dozing and the precrash safety system is not activated, turning a privacy mode of the vehicle on,
   in response to a determination that the driver is dozing and the precrash safety system is activated, turning the privacy mode of the vehicle off,
   in response to the privacy mode being on, prohibiting transmitting the specific information to the terminal device, and
   in response to the privacy mode being off, permitting transmitting the specific information to the terminal device.

6. The driver watching system according to claim 1, wherein the specific information is a position of the vehicle and information on a speed violation.

7. The driver watching system according to claim 1, wherein
   the vehicle information further includes a general information, and
   the second processor is configured to permit transmitting the general information to the terminal device regardless of a state of the privacy mode.

8. The driver watching system according to claim 7, wherein
   the general information includes a dozing detection information, a precrash safety system activation information, and a vehicle speed information.

* * * * *